US009109180B2

(12) United States Patent
Wolf et al.

(10) Patent No.: US 9,109,180 B2
(45) Date of Patent: Aug. 18, 2015

(54) METHOD FOR THE HYDROTHERMAL CARBONIZATION OF RENEWABLE RAW MATERIALS AND ORGANIC RESIDUES (75) Inventors: Bodo M. Wolf, Mindelheim (DE); Tobias Wittmann, Berlin (DE); Christian Von Olshausen, Berlin (DE)

(73) Assignee: SUNCOAL INDUSTRIES GMBH, Ludwigsfelde (DE)

( * ) Notice: Subject to any disclaimer, the term of this patent is extended or adjusted under 35 U.S.C. 154(b) by 470 days.

(21) Appl. No.: 13/262,336

(22) PCT Filed: Apr. 1, 2010

(86) PCT No.: PCT/EP2010/002104
§ 371 (c)(1),
(2), (4) Date: Nov. 8, 2011

(87) PCT Pub. No.: WO2010/112230
PCT Pub. Date: Oct. 7, 2010

(65) Prior Publication Data
US 2012/0103040 A1 May 3, 2012

(30) Foreign Application Priority Data

Apr. 1, 2009 (DE) .......................... 10 2009 015 257
Dec. 23, 2009 (DE) .......................... 10 2009 060 542

(51) Int. Cl.
*C01B 31/02* (2006.01)
*C10L 5/44* (2006.01)
*C10L 5/36* (2006.01)
*C10L 9/08* (2006.01)

(52) U.S. Cl.
CPC . *C10L 5/44* (2013.01); *C01B 31/02* (2013.01); *C10L 5/366* (2013.01); *C10L 9/08* (2013.01); *C10L 9/086* (2013.01); *Y02E 50/10* (2013.01); *Y02E 50/14* (2013.01); *Y02E 50/30* (2013.01)

(58) Field of Classification Search
CPC ....................................................... C01B 31/02
USPC ...................................................... 423/445 R
See application file for complete search history.

(56) References Cited

U.S. PATENT DOCUMENTS

| | | | |
|---|---|---|---|
| 3,552,031 A | 1/1971 | Evans et al. | |
| 3,992,784 A | 11/1976 | Verschuur et al. | |
| 5,354,345 A | 10/1994 | Nehls, Jr. | |
| 8,276,289 B2 * | 10/2012 | Causer | 34/90 |
| 2010/0101142 A1 | 4/2010 | Eisner et al. | |
| 2010/0162619 A1 | 7/2010 | Peus | |

FOREIGN PATENT DOCUMENTS

| | | |
|---|---|---|
| AT | 86234 | 11/1921 |
| DE | 10 2007 062 809 A1 | 7/2008 |
| DE | 10 2008 028 953 A1 | 12/2009 |
| EP | 1 970 431 A1 | 9/2008 |
| JP | 2001-46858 A | 2/2001 |
| JP | 2001-340831 A | 12/2001 |
| JP | 2003-300099 A | 10/2003 |
| JP | 2005-205252 A | 8/2005 |
| JP | 2006-62889 A | 3/2006 |
| JP | 2008-43902 A | 2/2008 |
| JP | 2010-514881 A | 5/2010 |
| WO | WO 2008/081409 A2 | 7/2008 |
| WO | WO 2008/095589 A1 | 8/2008 |
| WO | WO 2008/113309 A1 | 9/2008 |

OTHER PUBLICATIONS

English translation of Chinese Office Action dated Feb. 25, 2013.
German Office Action, Application No. 10 2009 015 257.1, Sep. 22, 2011, 4 pgs.
International Search Report, PCT/EP2010/002104, Jul. 26, 2010, 2 pgs.
Japanese Office Action and English translation thereof, Appl. No. 2012-502513, Apr. 22, 2014, 6 pgs.

* cited by examiner

*Primary Examiner* — Stuart Hendrickson
(74) *Attorney, Agent, or Firm* — Paul D. Strain, Esq.; Strain & Strain PLLC (57) ABSTRACT The present invention relates to a continuous method for the hydrothermal carbonization of renewable raw materials and organic residues, in which, in a first processing stage, a pressure increase essentially to the pressure level of the carbonization occurs, in the second processing stage, the carbonization, which is performed at a pressure of at least 5 bar and at most boiling temperature, the obtained carbonized product is at least partially settled as sediment, and the filling height of the water in the second processing stage is set by removing water, and the temperature of the sediment delivered from the second processing stage is reduced by the vaporization of water and it is supplied to the third processing stage, drying which is heated using steam, in which the drying is performed in steam atmosphere, and subsequently discharged from the process.

18 Claims, 5 Drawing Sheets

METHOD FOR THE HYDROTHERMAL CARBONIZATION OF RENEWABLE RAW MATERIALS AND ORGANIC RESIDUES

CROSS-REFERENCE TO RELATED PATENT APPLICATIONS

This application is a National Stage of International Application No. PCT/EP2010/002104, filed Apr. 1, 2010, which is based upon and claims the benefit of priority from prior German Patent Applications No. 10 2009 015 257.1, filed Apr. 1, 2009, and No. 10 2009 060 542.8, filed Dec. 23, 2009, the entire contents of all of which are incorporated herein by reference in their entirety.

The invention relates to a method for the hydrothermal carbonization of renewable raw materials and organic residues.

Renewable raw materials and organic residues, which can be used in the method according to the invention, are referred to hereafter by the terms feedstock or biomass. Feedstock or biomass is to be understood in the present case as vegetable and animal biomass as well as metabolic products, in particular renewable raw materials such as wood chips, green waste from landscape care, plants, straw, silage, and organic residues from agriculture and forestry, as well as the food industry and disposal business, and also turf, raw lignite, paper sludge and sewage sludge, marc, and the like, which are also referred to as feedstocks hereafter.

The feedstocks are converted by hydrothermal carbonization essentially into humus, coal, fertilizer, water, and $CO_2$.

With respect to the method according to the invention, the term "feedstock" is essentially to relate to the typical state, i.e., the respective degree of conversion, of the feedstock in the respective processing stage or step.

The area of application of the invention is the energetic use of renewable raw materials, the utilization of residues from agriculture, forestry, and food production, and of organic reusable materials from waste processing and the production of soil conditioners.

In the prior art, most biomass of the natural cyclic carbon cycle process is rotted or composted so it damages the environment and is thus substantially withdrawn from a higher-value material and energetic use. Industrial processes for converting the feedstocks into humus and coal by hydrothermal carbonization in mass production are not the prior art, although the scientific foundations for the conversion of these feedstocks into coal were published in 1913 by Bergius.

Scientific foundations for the conversion of the feedstocks, such as wood, straw, grass, green waste, landscaping wood, slop, cooking residues, corn silage, whole plant silage, and organic waste, but also turf and raw lignite, are provided through dehydration (cleavage of water) at temperatures between 180° C. and 300° C. in the presence of liquid water to form carbon-rich and oxygen-poor solids. Accordingly, during the reaction, the pressure must at least correspond to the saturated vapor pressure of the reaction mixture at the selected reaction temperature or be above it. As a function of the feedstocks used, reaching a minimum temperature is required in order to start the reaction. This is approximately 180° C. for sugar-rich feedstocks and is up to 220° C. for cellulose-rich and lignin-rich feedstocks. The dehydration is a time reaction, which first occurs very rapidly and then more and more slowly, until an equilibrium state is reached. Typically, depending on the desired product properties, residence times between 30 minutes and over 12 hours are required.

In parallel to the dehydration reaction, decarboxylation occurs, which results in cleavage of predominantly $CO_2$. This results in the formation of (permanent) gases during the reaction. At lower temperatures, the dehydration dominates, at higher temperatures the decarboxylation dominates. Therefore, the higher the temperature is selected, the more carbon is cleaved off in the form of $CO_2$ and is lost as a gas. The yield of the solid sinks simultaneously. However, the residence time can be reduced by increasing the temperature, since both the dehydration and also the decarboxylation run more rapidly. Furthermore, by increasing the temperature, the product quality achievable at maximum residence time (higher mass fraction of carbon and/or lower mass fraction of oxygen) can be improved. While a maximum carbon fraction of approximately 70% is achievable at temperatures of approximately 200° C., for example, a maximum carbon fraction of approximately 80% can be achieved at temperatures of approximately 300° C., for example.

In addition to the dehydration and the decarboxylation, an array of secondary reactions also occur, which have the result that, inter alia, water-soluble hydrocarbons form. Some of these water-soluble hydrocarbons subsequently again form a carbon-rich solid, they are thus intermediate products of the dehydration reaction. A fraction of the water-soluble hydrocarbons are organic acids, whose formation results in a reduction of the pH value. If the hydrothermal carbonization is performed at low temperatures, the predominant fraction of the liquid phase can be biologically degraded very easily. If the hydrothermal carbonization is performed at high temperatures, the fraction of hydrocarbons which are difficult to degrade biologically rises in the liquid phase, which can result in increased disposal costs.

The dehydration and decarboxylation can each be promoted by the addition of suitable catalysts. Therefore, the desired degree of conversion can already be achieved with lower temperature and reduced reaction time. Examples of effective catalysts are, inter alia, organic acids such as citric acid. Furthermore, some metals, and the salts and oxides thereof, are catalytically active in the hydrothermal carbonization reaction. A part of the catalytically active substances are already contained in various feedstocks and are thus introduced into the process. Others can either be added to the feedstocks before they enter the reactor or can be introduced into the reactor during running reaction to optimize the reaction. In some cases, the catalyst cannot be retrieved after the conversion (e.g., citric acid) or is destroyed during the reaction (e.g., formic acid). Therefore, the term "catalyst" cannot be applied in the strict meaning of the word. These auxiliary materials accelerate the reaction and reduce the above-mentioned required starting temperature, however, because of which essential properties of a catalyst are relevant.

A selection of catalysts are:
1) Inorganic Brønsted acids: $HNO_3$, $HCl$
2) Organic Brønsted acids: formic acid, acetic acid, citric acid, $NH_4Cl$
3) Lewis acids, such as metal halogenides: $FeCl_3$, $FeBr_3$, $AlCl_3$, $AlBr_3$
4) in general metal halogenides and oxides: $NaCl$, $FeO$, $Fe_2O_3$, $LiCl$, $[Fe(NH_4)_2(SO_4)_2].6H_2O$
5) Acid zeolites, e.g., H-ZSM-5

Although the carbonization reaction also occurs without a catalyst, the targeted selection of a matching catalyst system is advantageous for optimum process control, in order to set an advisable combination of reaction temperature and residence time in connection with a high yield, optimized carbon balance, and good product properties. In addition, the adaptation of the catalyst can decisively influence the quality of the byproduct processing water, the goal being a conductive water with low contaminant content.

The dehydration and decarboxylation of biomass is an exothermic process overall, in which heat must be dissipated.

One of the first technical implementations of dehydration of industrial slops in pressurized reactors at 250° C.-300° C. from the cellulose industry was described by Friedrich Bergius 1921 (AT86234).

Furthermore, U.S. Pat. No. 3,552,031 discloses a device for cleaving water off of organic material together with liquid water on the example of lignite at temperatures between 100° C. and 300° C. in a recumbent pressurized reactor, which is charged by a conveyor device and at whose end the dehydrated carbon is withdrawn again. The reactor is insulated and is externally heated. However, no statement is made about the guiding of the heat flows, whose efficient guiding has a significant influence on the cost-effectiveness of the method. A further disadvantage is the conveyor device in the interior of the reactor.

U.S. Pat. No. 3,992,784 also discloses a method for dehydrating organic material together with liquid water at greater than 150° C. on the example of lignite. The lignite is mixed with water and conveyed with the aid of a pump into a pressurized reactor. The mixture of water and lignite is preheated by heat transfer devices/heat exchangers, which use the heat of the product discharged from the reactor. The heating of the educts is exclusively performed via indirect heat transfer in the heat transfer devices/heat exchangers. The use of indirect heat transfer devices for preheating solid/liquid mixtures is difficult because of the poor heat transfer properties and the tendency to form caked-on material. Furthermore the dryer, which has a heat demand that is not to be underestimated, is not incorporated in the heat economy/balance of the plant.

WO 2008081409 A2 discloses a method and a device for the dehydration of biomass together with liquid water at temperatures greater than 150° C. in a pressurized reactor, which essentially comprises a loop reactor, into which the starting product is introduced. The reaction mixture located in the reactor is continually circulated and a part is removed from the reactor and subsequently dried. Furthermore, secondary assemblies are disclosed. A disadvantage of this known teaching is the complete circulation of the reactor contents. In this way, the reaction mixture only achieves a moderate residence time and a fraction of the biomass is discharged from the reactor again immediately after entering, which negatively influences the product quality. Furthermore, it is disadvantageous that the reaction mixture is delivered from the reactor having a low dry material fraction, whereby a large quantity of hot reaction water is also delivered, which must be replaced by colder water to close the water balance.

In addition, EP 1970431 A1 discloses a method and a device for the dehydration of biomass together with liquid water at temperatures greater than 100° C. The biomass is optionally preheated and introduced using a pump or airlock into a recumbent pressurized reactor, through which it is conveyed with the aid of a screw conveyor. The pressurized reactor is externally heated. The reacted biomass is delivered at the end of the pressure reactor either via a pump or a pressure airlock. A disadvantage of this teaching is the use of a screw conveyor in order to move the reactor contents through the tubular reactor. Rapid wear of the screw occurs due to the high temperatures and difficulties in sealing against the atmospheric pressure occur due to the high pressures.

Furthermore, WO 2008095589 A1 discloses an S-shaped reactor for the dehydration of biomass in liquid water, which lies in a bath of thermal oil, which can be cooled and heated as needed. A disadvantage of this variant is the poor controllability of the reactor interior temperature.

WO 2008113309 A1 discloses a wet-chemical conversion of biomass under the Earth's surface, for example, in coal shafts, the static pressure of the water ensuring heating to greater than 200° C. of layers located below 200 m and thus allowing a dehydration reaction. The path followed here of industrial conversion has disadvantages in relation to a plant located on the Earth's surface, since the reaction temperature cannot be readily controlled and required maintenance work can only be performed with difficulty.

The lack of widespread use of the findings of Bergius up to this point is doubtlessly caused by the unsatisfactory status in the transition of the scientific findings of hydrothermal carbonization into industrially usable method technology and the development of the devices in this regard, in addition to the not yet provided need for action.

The goal of the invention is the exploitation of the manifold conceivable feedstocks by improving the prior art in the conversion, in particular of specific large-volume organic feedstocks, preferably those having a high water content, by hydrothermal carbonization, in which the feedstocks are converted by dehydration and decarboxylation primarily into coal, humus, fertilizer, water, and $CO_2$, i.e., into standardizable reusable materials, feedstocks, auxiliary materials, and fuels having a high usage value, e.g., high combustion heat and low water content.

The object of the invention is to provide a simplified continuous method for the hydrothermal carbonization of biomass, which particularly achieves a high efficiency with respect to the heat and water economy of the process.

For this purpose, in particular pressure increase for the purpose of introducing the feedstocks into pressurized vessels, elevation of the carbon concentration of the feedstocks in a water bath under process-related temperatures and pressures, mechanical drainage and thermal drying of the carbonized products and optionally retrieval of the vegetable nutrients introduced with the raw materials and the water are proposed according to the invention.

The object is achieved by a continuous method for the hydrothermal carbonization of biomass, in which in a first processing stage, the pressure increase, the pressure of the feedstock is essentially increased to the pressure of the following processing step of at least 5 bar, the feedstock is converted in a second processing stage, the carbonization, with cleavage essentially of water and carbon dioxide at a pressure of at least 5 bar and at most boiling temperature of the water, into a carbonized product, the feedstock is substantially vertically transported in the second processing stage primarily by gravity, the feedstock (being converted), preferably in the upper part/area of the second processing stage, is preferably circulated essentially perpendicularly to the main flow direction between educt introduction and product delivery by removal and partial resupply of water from or into the second processing step, the feedstock (being converted) settles in the lower part/area of the second processing stage as water-containing sediment, the minimum height of the sediment is selected so that the solid content is increased by sedimentation to at least 15%, preferably at least 20%, more preferably at least 25%, particularly preferably at least 30%, and the maximum height of the sediment layer is thus limited, e.g., by circulation and/or adding hot steam, so that a solid bottoms fraction does not form due to the static pressure, the filling height of the water level in the second processing stage is regulated by the removal and supply of water in the processing stage, the permanent gases occurring in the second processing stage are discharged from the second stage in countercurrent to the feedstock entering the second processing stage, so that the included water vapor fraction at least partially condenses on the feedstock, which is colder in relation thereto, and the permanent gases are only then discharged from the process, and the sediment is delivered from the second processing stage and cooled essentially by vaporizing water to essentially the temperature level of a third processing stage, drying which is heated using steam, in which the drying is performed in steam atmosphere, and supplied thereto, and is delivered therefrom as the final product in the form of marketable coal having water contents of less than 30, preferably less than 20, in particular less than 15 mass-%.

The essential action principle of the present invention is a simple embodiment with respect to the method having simultaneously optimized energy balance, which is achieved by an increased solid product delivery from the second processing stage while simultaneously retaining the largest possible quantity of heated water in the second processing stage and avoiding the formation of a solid bottoms fraction coupled with obtaining waste heat from the recooling of the sediment and the drying in the form of water steam.

The continuous method according to the invention for the hydrothermal carbonization of the feedstocks can advantageously be implemented in that at least one of the following measures is executed:

In the first processing stage, the pressure of the feedstock is essentially increased to the pressure of the following processing stage of at least 5 bar and the temperature of the feedstock is increased by the mixing thereof with wastewater and/or waste steam from the following processing stages, which is hotter in relation to the temperature of the feedstock, and, expediently before the introduction of the feedstock into the second processing stage, at most as much water is separated from the feedstock again as was previously supplied, and, of the separated water, as much water as possible is expediently removed from the process as is or was separated from the feedstock in the following processing stages of carbonization and drying, and, in addition, water supplied in the first processing stage remains in the process as circulating water, the feedstock in the second processing stage is preheated and chemically digested by condensation of the water vapor arising in the processing stage itself, and is converted into the carbonized product in a water bath operating under maximum boiling conditions having a pressure of at least 5 bar by cleavage of the chemically bound water and carbon dioxide, the feedstock is essentially vertically transported in the second processing stage primarily by gravity, the feedstock (being converted) is preferably circulated in the upper part/area of the second processing stage by removal and partial further supply of water from or into, respectively, the second processing stage preferably essentially perpendicularly to the main flow direction between educt introduction and product delivery, the feedstock (being converted) settles in the lower part of the second processing stage as water-containing sediment, the minimum height of the sediment is selected so that the solid content is increased by sedimentation to at least 15%, preferably at least 20%, more preferably at least 25%, particularly preferably at least 30% and the maximum height of the sediment layer is limited, e.g., by circulation and/or hot steam supply, so that a solid bottoms fraction does not form due to the static pressure, the filling height of the water level in the second processing stage is regulated by the removal and supply of water in the processing stage, the thermal equilibrium of the second processing stage is obtained through the resupply of the water removed for the circulation, which can advantageously be heated outside the second processing stage by adding hot steam and/or in a heat exchanger in the event of a heat demand in the second processing stage, if necessary by the removal of steam and if necessary by adding external hot steam, which condenses in the processing stage, excess steam which arises and does not condense in the second processing stage is removed from the second processing stage and resupplied to the second processing stage and/or discharged from the second processing stage for the purpose of being used, preferably in another processing stage, the permanent gases arising in the second processing stage are discharged from the second processing stage in counterflow to the feedstock entering the second processing stage in such a way that the included water steam fraction at least partially condenses on the feedstock, which is colder in relation thereto, and the permanent gases are only then discharged from the process, the sediment is delivered from the second processing stage and cooled essentially by vaporization of water to essentially the temperature level of a third processing stage, drying which is heated using steam, in which the drying occurs in a steam atmosphere, and supplied thereto and is delivered therefrom as the final product in the form of marketable coal having water contents of less than 30, preferably less than 20, in particular less than 15 mass-%.

Preferred embodiments of the three processing stages are described hereafter.

Preferred embodiments of the first processing stage, the pressure increase, are: 1. Pressure increase of the feedstock together with a liquid and 2. Pressure increase of the feedstock together with a gas.

In the first preferred embodiment of the first processing stage, the pressure increase of the feedstock together with a liquid, according to the invention the conveyability of the feedstock is improved with respect to the technology used for the pressure buildup, preferably a piston pump, an eccentric screw pump, a rotary vane feeder, a pressure airlock, or a rotary piston pump, by filling up at least a part of its gap volume with wastewater from the following processing stages, which is hotter in relation to the temperature of the feedstock. The flowability and the compressibility or incompressibility of the feedstock used are therefore improved by the addition of water. The addition of water is performed according to the invention before the increase of the pressure to the pressure of the following processing stage, which is at least 5 bar for technical expediency. The quantity of the supplied water is selected so that the conveyability using the selected technology can be ensured. Preferably, more water is to be supplied than the technically required minimum quantity, in order to minimize wear. The dry material fraction (TS fraction) during the pressure increase is preferably less than 25% and greater than 2%, more preferably less than 15% and greater than 5%. Through the use of hot wastewater from the following processing stages, the perceptible heat of the hot waste water can be transferred to the feedstock and the energy efficiency can thus be improved. To further increase the temperature, waste steam from the following processing stages, which condenses on the feedstock that is colder in relation thereto, can additionally be added. Through the use of hot waste steam from the following processing stages, both the perceptible heat and also the latent heat of the hot waste steam can be transferred to the feedstock and the energy efficiency can thus be improved further. The addition of the waste steam is preferably performed before the addition of the wastewater. For technical expediency, the temperature of the feedstock is only increased enough by the addition of wastewater and/or waste steam that excess formation of exhaust vapors does not occur and is limited by the boiling conditions. The temperature of the feedstock after the addition of water and steam is preferably greater than 60° C. and less than 100° C., more preferably greater than 80° C. and less than 100° C., particularly preferably greater than 90° C. and less than 100° C. After pressure has been applied to the feedstock which is filled up in this way, the added wastewater and/or the added, condensed waste steam is at least partially separated from the feedstock again immediately before the entry of the feedstock into the second processing stage, so as not to load the second processing stage with an excessively large quantity of colder water in relation to the reaction temperature. Of the separated water, expediently at most an amount is discharged from the process as would be separated from the feedstock in the following processing stages (carbonization and drying). The quantity of water discharged from the process between the first and second processing stages therefore expediently corresponds to at most the difference between the quantity of water introduced with the feedstock into the first processing stage and the quantity of water delivered with the final product. The water which is not discharged typically remains as circulating water in the process.

In the second preferred embodiment of the first processing stage, the pressure increase of the feedstock together with a gas, is implemented according to the invention by a periodically operating pressure airlock, which comprises at least one low-pressure airlock and at least one high-pressure airlock. The cycling of the airlocks is to be designed so that in a first cycle, the low-pressure airlock, which is filled using a mixture of water steam and permanent gases in normal operation before the relaxation thereof, is relaxed in relation to the atmospheric pressure so that the water steam fraction of the gas vapor mixture at least partially condenses on the feedstock (prepared for the pressure increase) and the remaining gas phase can be obtained separately and discharged from the process, in a second cycle, the feedstock thus preheated is conveyed into the open low-pressure airlock, preferably by gravity, and the airlock is then locked, in a third cycle, the high-pressure airlock, which is filled using a mixture of water steam and permanent gases in normal operation before the relaxation thereof, is relaxed into the low-pressure airlock so that the water steam fraction of the gas vapor mixture at least partially condenses on the feedstock located in the low-pressure airlock, in a fourth cycle, the feedstock, which thus has pressure applied thereto and is further preheated, is conveyed from the open low-pressure airlock into the open high-pressure airlock, preferably by gravity, and this airlock is then locked, in a fifth cycle, the high-pressure airlock is tensioned using a gas vapor mixture from the second processing stage so that the water steam fraction of the gas vapor mixture at least partially condenses on the feedstock located in the high-pressure airlock and essentially the pressure of the second processing stage is applied to the airlock, and in a sixth cycle, the feedstock, which thus has pressure applied thereto and is further preheated, is conveyed from the open high-pressure airlock into the second processing stage, preferably by gravity, and it is then locked.

Hot steam is preferably to be introduced into the high-pressure airlock between the fourth and fifth cycles so that it condenses on the feedstock and the temperature of the feedstock is thus essentially increased to the temperature level of the second processing stage, whereby the pressure is also equalized to the pressure level of the second processing stage. Through this measure, the pressure variations in the second processing stage occurring during the fifth cycle are reduced. Furthermore, waste steam from one of the downstream processing stages is preferably to be introduced into the low-pressure airlock between the second and third cycles so that it condenses on the feedstock and the temperature of the feedstock is thus increased. Through this measure, the quantity of hot steam required for preheating the feedstock is reduced. In addition, the temperature of the feedstock is preferably to be increased before the first cycle by the mixing of the feedstock with wastewater from the following processing stages, which is hotter in relation to the temperature of the feedstock, and/or with waste steam from the following processing stages, which condenses on the colder feedstock. The addition of wastewater and/or waste steam is to be performed precisely as described in the first preferred embodiment of the first processing stage. The added wastewater and the condensed waste steam are substantially separated from the feedstock again before the pressure increase, however. The amount of the separated water discharged from the process is at most that which is or would be separated from the feedstock in the following processing stages (carbonization and drying). Therefore, the quantity of water discharged from the process between the first and second processing stages at most corresponds to the difference between the quantity of water introduced with the feedstock in the first processing stage and the quantity of water discharged with the final product. The water which is not discharged typically remains as circulating water in the process.

The preferred embodiment of the second processing stage, the carbonization, in which the feedstock is converted into a carbonized product with cleavage of substantially chemically bound water and carbon dioxide at a pressure of at least 5 bar and at most boiling water temperature, can be divided according to the invention into essentially three processing steps, in the first processing step, the preheating, the feedstock particularly being preheated or heated to the reaction temperature by condensation of the water steam arising in the second processing stage itself and optionally the addition of hot steam and/or the addition of water, which is taken from the second processing stage and is heated outside the second processing stage and returned, in the second processing step, the carbonization, the temperature achieved in the first processing step, in particular the reaction temperature, is advantageously maintained and the feedstock is reacted in a water bath, which operates at most under boiling conditions, at a pressure of at least 5 bar by cleavage of predominantly chemically bound water and carbon dioxide, and in the third processing step, the sedimentation, the (reacting) feedstock settles or is permitted to settle as water-containing sediment.

The material transport in the second processing stage is advantageously primarily performed by gravity, i.e., essentially vertically in an upright reactor, whereby a main flow direction results from the educt introduction to the product delivery on the reactor in the third processing stage, the drying.

The temperature of the feedstock entering the first processing step of the second processing stage essentially corresponds to the temperature achieved in the first processing stage by preheating. The temperature of the feedstock is increased, to the temperature of the second processing step of the second processing stage, in the first processing step of the second processing stage by the condensation of water steam arising in the second processing step of the second processing stage and, if necessary, by the direct addition of hot steam and/or by the addition of water which is taken from the second processing stage and heated outside the second processing stage, preferably by the direct addition of hot steam or in a heat exchanger, and returned.

The temperature in the second processing step of the second processing stage at least corresponds to the minimum temperature required for the conversion of the selected feedstock, which can be taken from the literature or ascertained according to the experiments described therein. It can also be selected as higher to accelerate the conversion. The temperature is preferably between 150° C. and 250° C., more preferably between 180° C. and 230° C. The pressure of the second processing stage at least corresponds to the saturated steam pressure of the temperature of the second processing step or is higher. Nearly boiling conditions preferably prevail in the second processing step.

In the second processing step, the feedstock reacts with cleavage of substantially chemically bound water and carbon dioxide. The temperature can locally rise above the boiling temperature through the carbonization reaction, which is exothermic overall, whereby water steam results, which rises and preferably condenses again in the first processing step. It has proven to be energetically advantageous in the method control according to the invention that the condensate from the first processing step (preheating) flows back again to the second processing step (carbonization) of the second processing stage.

According to the invention, the thermal equilibrium of the second processing step of the second processing stage can be obtained by removing and resupplying water, which can advantageously be heated outside the second processing stage by adding hot steam or in a heat exchanger in the event of a heat demand in the second processing step of the second processing stage, or if necessary by removing steam and if necessary by directly adding hot steam, which condenses in the processing stage.

The feedstock being converted settles as water-containing sediment in the third processing step of the second processing stage according to the invention. Through the buildup of a sediment layer, a concentration of solid is achieved and therefore it is ensured that an increased solid product delivery from the second processing stage is achieved while simultaneously obtaining the greatest possible quantity of heated water in the second processing stage. The height of the sediment layer is expediently at least 0.5 m, preferably 1 m, more preferably at least 2 m in order to achieve a sufficient concentration of solid material.

Furthermore, it is ensured by the buildup of a sediment layer that the product delivered from the second processing stage has a minimum quality, since the feedstock is subjected to process-related temperatures and pressures and is therefore subjected to carbonization during the time in which it passes through the third processing step, and it is prevented from being delivered again from the second processing stage shortly after its entry therein. Therefore, a minimum residence time can be set according to the invention via the height of the sediment layer and therefore a minimum product quality can be achieved. The minimum residence time of the feedstock in the third processing step is preferably between 30 and 180 minutes, more preferably between 40 and 120 minutes, particularly preferably between 50 and 90 minutes.

Since no direct introduction of heat can be performed in the third processing step via an addition of hot steam or heated circulating water, since this would disturb the sediment layer, the sediment layer slowly cools down because of heat loss to the colder surroundings. In a preferred embodiment, the temperature of the second processing stage is preferably selected so that process-related temperatures still also prevail in the third processing stage and carbonization occurs. In another preferred embodiment, the third processing stage is also indirectly heated externally by heat exchangers.

To avoid the formation of a solid bottoms fraction made of sediment, which can have an obstructive effect on the product delivery from the second processing stage into the third processing stage, the height of the sediment layer and therefore the boundary between the second processing step and the third processing step, which grows because of gravity without interference, is limited by the removal and at least partial resupply of water from or into, respectively, the second processing step. The location and the manner of the water removal are preferably selected so that a lesser loading with solid is ensured. This is the middle of the cylinder in the case of an ideal, horizontally rotating cylinder. The solid retention can be supported by the use of preferably slotted screens. The resupply of the water is advantageously performed essentially transversely to the main flow direction, i.e., from the educt introduction to the product delivery, of the second processing stage, in order to minimize the vertical mixing through of the carbonizing feedstock and therefore a disturbance of the desired sediment layer in the third processing step. In the case of an upright reactor, essentially horizontal circulation thus occurs.

According to the invention, the water level in the second processing stage, to implement the second processing step of the second processing stage, is regulated by removing water or optionally also by supplying water, preferably wastewater from another processing stage, in the second processing stage. The mentioned water removal or supply allows particularly simple control or monitoring of the water level. The pressure of the water discharged from the second processing stage and not supplied thereto again is reduced to approximately ambient pressure in a preferred embodiment variant by flash vaporization or in a heat exchanger and the water is then expediently supplied to the first processing stage or discharged from the process. If water is supplied to the second processing stage, hot wastewater from the first or third processing stage is preferably used, which is preferably be heated by adding waste heat, whereby the energy efficiency is improved.

The permanent gases arising in the second processing stage are discharged from the second processing stage in counterflow to the feedstock entering the second processing stage in such a way that the included water steam fraction at least partially condenses out on the feedstock, which is colder in relation thereto. The method control according to the invention has proven to be energetically advantageous in that the latent heat of the water steam fraction of the gas phase is not discharged from the second processing stage, but rather can be at least partially retrieved by condensation.

In the combination of this preferred embodiment of the second processing stage with the first preferred embodiment of the first processing stage, the pressure increase in the presence of a liquid, the control of the permanent gases is preferably designed so that their water steam fraction condenses out in the first processing step of the second processing stage and the permanent gases are discharged from the process between the first processing step of the second processing stage and the first processing stage.

In the combination of this preferred embodiment of the second processing stage with the second preferred embodiment of the first processing stage, the pressure increase in the presence of a gas, the control of the permanent gases is preferably designed so that their water steam fraction partially condenses out in the high-pressure airlock, partially in the low-pressure airlock, and partially on the feedstock before the introduction thereof into the low-pressure airlock, and is only discharged from the process there.

According to the invention, the pressure level of the sediment delivered from the second processing stage is relaxed by relaxation and the temperature level of the sediment delivered from the second processing stage is relaxed by the vaporization of water to essentially the pressure and temperature level of the third processing stage of drying which is heated using steam, in which the drying is performed in steam atmosphere (preferably atmospheric steam fluidized bed drying, pressure-charged steam fluidized bed drying, a fluidized bed drying plant, or steam fluid drying) and supplied thereto and delivered therefrom as the final product in the form of marketable coal having water contents of less than 30, preferably less than 20, in particular less than 15 mass-%.

The drying according to the invention in steam atmosphere allows essentially saturated steam (having a permanent gas content typically of less than 5 mass-%, preferably less than 1 mass-%) to be obtained from the drying, which can be condensed while emitting heat. The condensation can be performed directly or preferably after a compression or relaxation.

In a preferred embodiment of the pressure and temperature reduction, this is simultaneously performed by the flash vaporization of the part of the water delivered with the sediment from the second processing stage, preferably at a throttle valve or in a periodically operating relaxation airlock. It has proven to be energetically advantageous in this preferred method control that the quantity of the generated steam is maximized, since no losses occur due to the use of heat exchangers.

In another preferred embodiment of the pressure and temperature reduction, the temperature reduction is performed first by the heating and vaporization of water, particularly preferably hot steam condensate from the drying, in a counterflow heat exchanger immediately before the pressure reduction, which is preferably implemented in a relaxation airlock, rotary vane feeder, or throttle. It has proven to be energetically advantageous in this preferred method control that both steam and also, if this is required for closing the water balance of the second processing stage, hot water can be obtained in the heat exchanger and this can then be supplied to the second processing stage, if it is necessary to close the water balance.

In a preferred embodiment of the reduction of the temperature level of the sediment delivered from the second processing stage, the steam which is generated during the reduction of the temperature level of the sediment delivered from the second processing stage is obtained at two pressure levels, the first pressure level essentially corresponding to the pressure level of the hot steam required for heating the dryer and the second pressure level essentially corresponding to the pressure level of the dryer. The steam which is essentially obtained at the pressure level of the hot steam for the dryer can then be used for heating the dryer. If the steam which is essentially obtained at the pressure level of the hot steam for the dryer is obtained by flash vaporization, it is either isothermally washed using hot steam condensate from the drying and only then used for heating the dryer or it is condensed in a heat exchanger to generate live steam and the obtained live steam is used for heating the dryer. If a heat exchanger is used, it is to be noted that the pressure level of the flash steam is somewhat above the pressure level of the hot steam for the dryer, in order to reduce the required heat exchanger surface areas. If the steam generated during the temperature reduction of the sediment delivered from the second processing stage does not fall continuously but rather periodically because of the implementation in the method of the pressure and temperature reduction in a relaxation airlock, for example, an equalization of the steam mass flow is to be ensured by expedient steam storage, preferably a roots accumulator.

According to a preferred embodiment of the third processing stage, it is composed of the drying, which is heated using steam, in steam atmosphere and an upstream mechanical drainage, preferably a centrifuge, band press, filter press, or piston press. In a preferred embodiment, the mechanical drainage essentially operates at the pressure level of the drying, whereby the pressure and temperature reduction of the sediment discharged from the second processing stage is performed before the mechanical drainage and the mechanical drainage must only withstand low pressure and temperature requirements. Only the concentrate occurring upon the mechanical drainage is introduced into the drying, which is heated using steam, in steam atmosphere and the filtrate is preferably used to close the water balance of the second processing stage, furthermore, it is preferably supplied to the first processing stage before the pressure increase and, after releasing a part of its perceptible heat, it is discharged again before the second processing stage and/or preferably supplied to conditioning, preferably biological conditioning, optionally having upstream wet oxidation, or if desired directly to utilization, optionally after concentration by evaporation. In a second preferred embodiment, the mechanical drainage operates essentially at the pressure of the second processing stage, the sediment discharged from the second processing stage first being resolved into a concentrate and a filtrate and these two streams being guided further separately. The concentrate is brought (as described above for the sediment) essentially to the pressure and temperature level of the drying, which is heated using steam, in which the drying is performed in steam atmosphere, with vaporization of residual water, and supplied thereto. The filtrate, which arises at high pressure and high temperature, can preferably be used to close the water balance of the second processing stage and the fraction not required for this purpose is preferably supplied to thermal conditioning, preferably wet oxidation, and then cooled again by the vaporization of water, e.g., by flash vaporization or in a heat exchanger, and relaxed to ambient pressure and preferably supplied to conditioning, preferably biological conditioning or if desired directly to utilization, optionally after concentration by evaporation.

According to a preferred embodiment, the steam-heated drying in steam atmosphere operates essentially at ambient pressure, whereby a drying technology having a simple method can advantageously be used. According to another preferred embodiment, the steam-heated drying in steam atmosphere operates in overpressure, the pressure level of the drying advantageously being selected so that the pressure level of the hot steam used for heating the second processing stage essentially corresponds to the pressure level of the hot steam required for heating the dryer, the temperature difference between the hot steam temperature of the steam used for heating the dryer and the drying temperature preferably being between 20 K and 70 K, more preferably between 30 K and 60 K.

The method control according to the invention via the three processing stages (pressure increase, carbonization, drying) allows the process waste heat from the second and third processing stages to be obtained predominantly in the form of saturated steam, which has a particularly advantageous effect on the possibility of using this process waste heat. Process waste heat is understood in particular to include:

steam which is obtained during the temperature reduction of the water removed from the second processing stage and not resupplied thereto,
  steam which is obtained during the temperature reduction of the water-containing sediment discharged from the second processing stage, if no drainage or mechanical drainage is performed at ambient pressure,
  steam which is obtained during the separate temperature reduction of the filtrate and concentrate obtained during the mechanical drainage of sediment discharged from the second processing stage, if the mechanical drainage is performed at the pressure level of the second processing stage, and
  steam which is obtained during the drying in steam atmosphere.

In a preferred embodiment, this steam is isothermally washed using hot steam condensate from the drying before further use, whereby volatile organic compounds and dust can be separated. The pH value of the washing is preferably adapted so that substantial purification occurs.

In another preferred embodiment, this steam is condensed in heat exchangers and live steam is thus generated. Upon the use of heat exchangers, it is to be noted that the temperature and therefore also the pressure of the steam to be condensed must be above the temperature and therefore the pressure of the steam to be generated in order to ensure effective heat transfer. When the text refers to "essentially" the same pressure level, this also refers to the pressure difference required for the heat transfer.

In a preferred embodiment, the washed steam or the live steam is compressed or relaxed in a force process while releasing technical work, the pressure stages of the compression expediently being determined by the pressure level required for heating the dryer and heating the second processing stage. In another preferred embodiment, the steam is condensed while releasing heat and this heat is preferably used for heating purposes. In a further preferred embodiment, the hot steam for heating the dryer and optionally the hot steam required for heating the second processing stage are decoupled from a counter pressure turbine of a steam power process, the pressure level of the decoupling essentially corresponding to the pressure level of the hot steam required for heating the dryer and optionally corresponding to the pressure level which is required for heating the second processing stage and the waste steam obtained in the second and third processing stages condensing while releasing heat and this preferably being coupled into the steam power process, for feed water preheating.

To further improve the heat and water balance of the method, the water possibly occurring in the isothermal washing of the flash steam and drying steam, the processing water possibly separated in the mechanical drainage, and the condensate possibly occurring during the generation of live steam, optionally after upstream purification of contaminants, such as dust, are advantageously supplied to either the first processing stage before the pressure increase and discharged again, after releasing a part of its perceptible heat, before the second processing stage and then supplied to conditioning or optionally directly to usage, optionally after concentration by evaporation, and the optionally separated contaminants are discharged from the process.

The economic advantages of the invention are an optimized energy balance and minimal water balance of the hydrothermal carbonization, which result from the method control according to the invention, which additionally achieves, with a high-value quality of the final product, which is required for the substitution of fossil coal and is typical on the market, the usage of the occurring waste heat, preferably internally for product drying, and optionally the heating of the feedstocks with the aid of steam compression according to the heat pump principle, or preferably externally by expansion of the steam to ambient pressure level, e.g., for the purpose of obtaining electrical energy from the process waste steam or preferably externally by condensation to provide thermal heat.

The final product of the method according to the invention can be provided, for example, in the form of marketable coal having water contents of less than 30, preferably less than 20 mass-%, more preferably less than 15 mass-%.

The invention also relates to combinations of preferred embodiments, if they do not mutually preclude one another.

The invention will be explained on the basis of the following examples, without being restricted to the specially described embodiments, however.

EXEMPLARY EMBODIMENT

Figure 1:
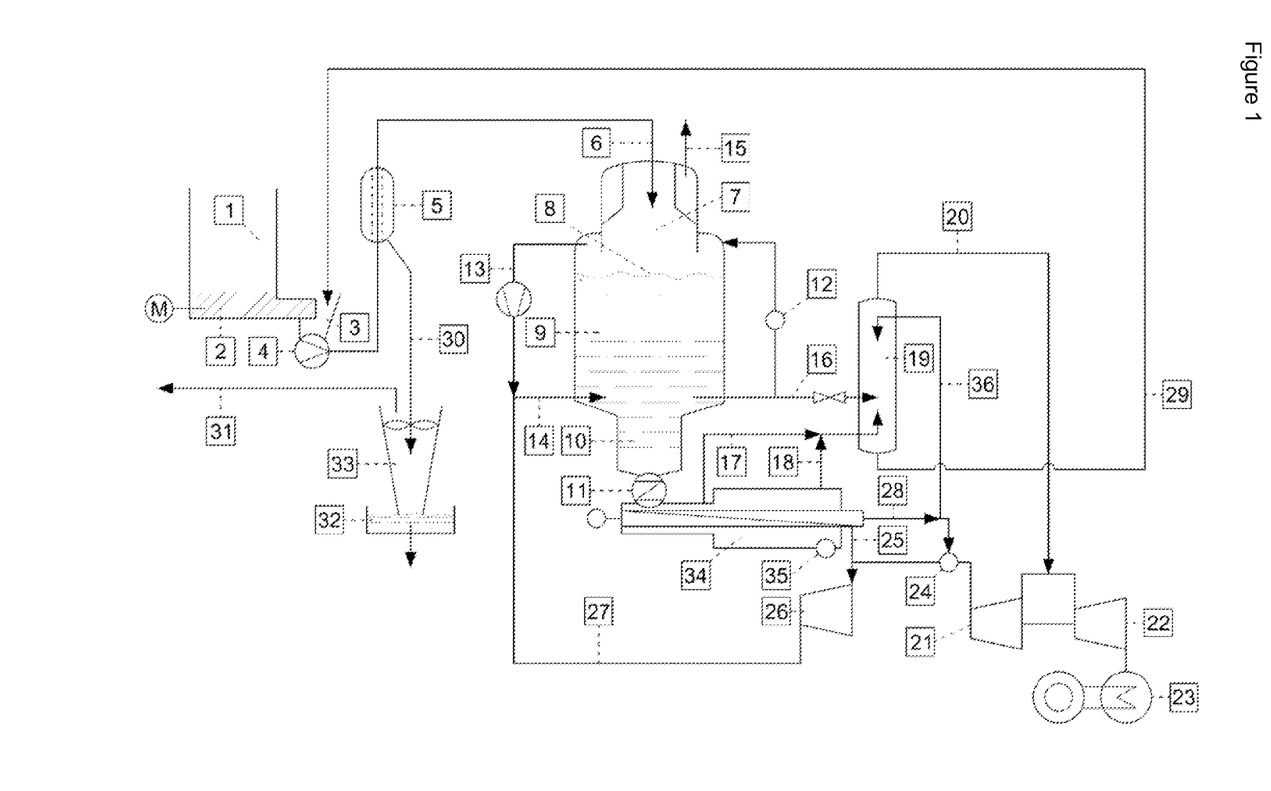
FIG. 1. Continuous Method for Hydrothermal Carbonization of Biomass (Wood Chips, 20×20×20 mm)

The invention is described as follows with the aid of FIG. 1 on an exemplary embodiment:

The feedstock is to be wood chips having a dry material fraction of 50 mass-% and an edge length of at most 30×20× 20 mm.

2000 kg/h of wood chips, corresponding to an energy output of 5155 kW, are taken from the bulk goods silo 1 via the conveyor device 2 at ambient temperature and supplied to the first processing stage, comprising the delivery funnel 3, the thick-matter pump 4, and the water separation 5.

The pumping capability of the feedstock is produced in that the gap volume of the feedstock is filled up using 2000 kg/h process-internal wastewater 29, which was taken from the isothermal steam washing 19, in the delivery funnel 3. The solid fraction of the feedstock before the pump 4 therefore decreases to 25 mass-%. The feedstock is thus preheated to a temperature of greater than 50° C.

The thick-matter pump 4 raises the pressure of the feedstock-water mixture to 25 bar and conveys it to the first processing step 7 of the second processing stage via the water separator 5, in which approximately 1300 kg/h processing water 30 is separated and discharged from the process, e.g., while obtaining the nutrients of the feedstock dissolved in the process as fertilizer 32, via a thickening 33, which is achieved by releasing vapors 31.

Via the bulk goods delivery 6, the preheated feedstock having a solid content of 37 mass-% reaches the first processing step 7 of the second processing stage, which operates under a pressure of 20 bar and in which the solid releases entrained water, which flows to the second processing step 9 of the second processing stage and in which the feedstock is heated by the saturated steam, which rises from the second processing step 9 of the second processing stage and condenses, to the temperature required for hydrothermal carbonization, in this example 210° C.

The feedstock which is preheated in the first processing step 7 of the second processing stage forms a bulk layer 8, which sinks due to gravity into the water bath of the second processing step 9 of the second processing stage, where it is carbonized under a pressure of 20 bar and the boiling temperature of the water, while separating the majority of its chemically bound water and forming permanent gases, such as carbon dioxide, which are discharged from the process via 15, while releasing heat.

The carbonized product settles in the third processing step 10 as sediment and is delivered mechanically therefrom via 11 in a regulated manner, with flash vaporization of a part of the sediment water, into the dryer 34.

The heat budget of the second processing stage is maintained under approximately isothermal reaction conditions in the second processing step by the removal of processing water 16 from the second processing step, by the circulation 13, and by the addition of steam 27 via the steam supply 14 and the circulation of processing water 12 at boiling temperature.

The sediment conveyed via 11 from the second processing stage into the drying 34 of the third processing stage is indirectly dried therein with the aid of steam-heated surfaces, with formation of hot steam condensate 28, under slight overpressure in a steam atmosphere. The saturated steams 17 and 18 arising during the sediment output 11 and during the drying 34, as well as the flash steam from of the water taken from the second processing stage via 16 are isothermally washed in the steam washer 19 at slight overpressure using the hot steam condensate 36, which arises during the drying, or processing water 16.

The washed steam 28, which arises at a pressure of somewhat more than ambient pressure, is compressed in 21 to the hot steam pressure required for implementing the third processing stage, recooled to essentially saturated steam conditions by injecting hot steam condensate in 24, and then supplied to the heated surfaces of the drying via 25.

Flash steam not required for implementing the third processing stage can relax to ambient temperature level in an expansion 22 according to the invention while releasing technical work and can be liquefied in a condensation 23 and then either supplied to the process again or discharged from the process, the water discharged here correspondingly reducing the water delivery via 30.

If a need for heating exists in the second processing stage, according to the invention, steam compressed in 21 can be supplied after the recooling in 24 to a second compression stage 26 and compressed therein to the pressure required for feeding into the second processing stage via 14.

In the example, the final product is a product similar to lignite pulverized fuel, which is discharged via 35 from the process having a mass flow rate of approximately 700 kg/h, a water content of approximately 15 mass-%, and a heating value of 4,925 kW.

The energetic efficiency of the chemical conversion is greater than 95% in the example.

Figure 2:
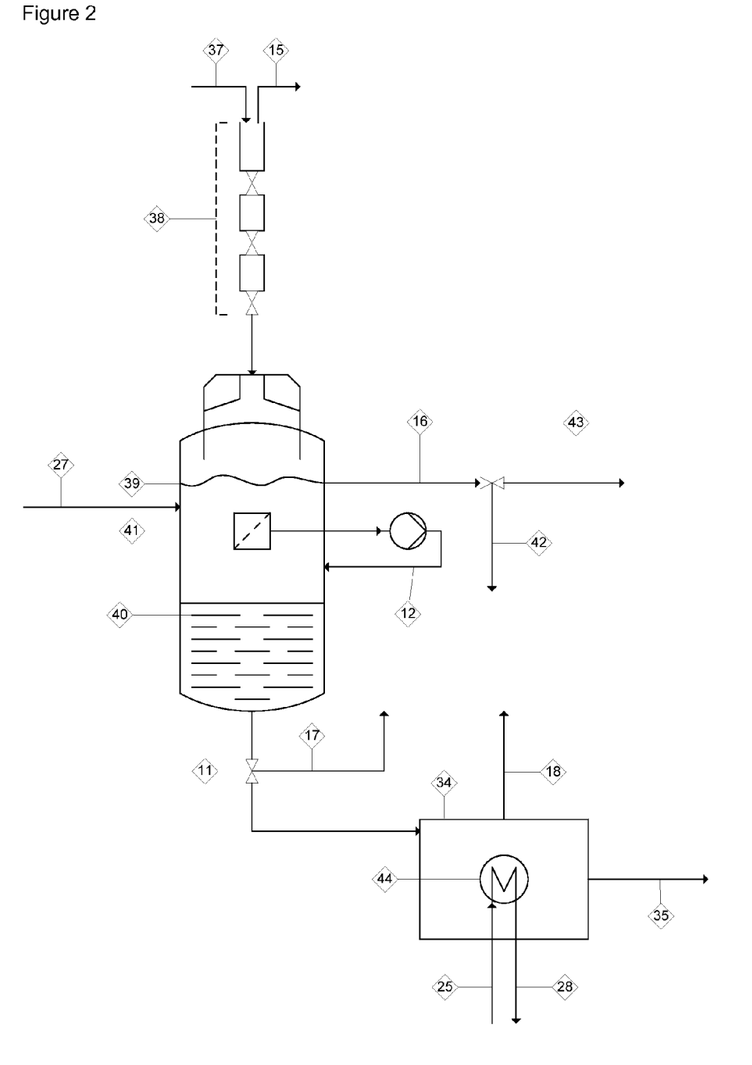
FIG. 2. Continuous Method for Hydrothermal Carbonization of Biomass (Grass and Foliage)

The invention will be described as follows with the aid of FIG. 2 on a second exemplary embodiment:

The feedstock is to be a mixture of grass and foliage from landscape care having a dry material fraction of 40 mass-% and a length of at most 20 mm.

1 t/h of the feedstock 37 (0.4 t/h dry material and 0.6 t/h water) is continuously supplied at ambient temperature to the first processing stage, comprising a device for pressure increase, in this example a two-stage pressure airlock 38, which comprises a receiver for the feedstock, as well as a low-pressure airlock, a high-pressure airlock, and three airlock valves.

The pressure airlock 38 operates periodically and raises the pressure of the feedstock to 18 bar, the feedstock 37 being transported by gravity from the receiver into the first low-pressure airlock, from the low-pressure airlock into the high-pressure airlock, and therefrom directly into the second processing stage, comprising a vertical upright reaction container.

The feedstock is introduced from above into the second processing stage, which operates under a pressure of 18 bar and releases water entrained in the solid, and is preheated therein by the addition of 0.3 t/h hot steam via 27 to the temperature required for hydrothermal carbonization, in this example 190° C.

The feedstock sinks due to gravity into the water bath 39, where it carbonizes while releasing heat under a pressure of 18 bar and maximum boiling temperature of the water with separation of 0.04 t/h chemically bound water and formation of 0.04 t/h permanent gases, such as carbon dioxide, which are discharged from the process via 15, and settles as sediment 40.

The sediment 40 is mechanically delivered having a solid content of 30% (0.32 t/h solid and 0.75 t/h water) from the second processing stage via 11, in a regulated manner with flash vaporization of a part of the sediment water 17 (0.17 t/h), whereby the solid fraction increases to approximately 36%, and is introduced into the dryer 34 of the third processing stage.

The thermal equilibrium of the second processing stage is maintained by the removal of processing water via a removal device having solid retention 41, the circulation 12 and reintroduction thereof, by the addition of hot steam 27 and the discharge of water via 16.

The introduction of the hot steam and the circulating water 12 is performed tangentially so that the upper part/area of the second processing stage is circulated essentially horizontally and the height of the sediment 40 is thus limited, so that a solid bottoms fraction does not form. Simultaneously, by permitting sedimentation according to the invention, the solid content at the sediment output 11 is increased to approximately 30 mass-%, so that a large quantity of hot water remains in the second processing stage, which forms the water bath 39 in which the carbonization occurs, and only the water which is not delivered with the sediment but is introduced together with the feedstock or as hot steam into the second processing stage and the chemically bound water cleaved from the feedstock in the second processing stage (together approximately 0.19 t/h) are discharged via 16 from the second processing stage and relaxed in a regulated manner while releasing flash steam 42 and provided for further use as relaxed processing water 43. The water bath has a solid content of less than 10 mass-% above the sediment layer in this example, which ensures a good circulation capability. It is clear from this example that permitting the buildup of a sediment layer according to the invention results in a substantial concentration of solid at the sediment output and thus a majority of the processing water can be kept in the second processing stage. The buildup of the sediment has the further result that the feedstock remains for a minimum time, in this example 60 minutes, in the second processing stage, so that a minimum conversion can occur and a minimum product quality is guaranteed, in this case a carbon fraction of greater than 55 mass-%.

The sediment conveyed via 11 from the second processing stage into the dryer 34 of the third processing stage is dried indirectly therein with the aid of steam-heated surfaces 44, while forming hot steam condensate 28, under slight overpressure in a steam atmosphere and discharged from the process having a water content of 10 mass-% (0.32 t/h solid and 0.04 t/h water) via 35. Approximately 0.54 t/h saturated steam 18 arises. The flash steams 17 and 42 arising during the sediment relaxation 11 and processing water relaxation and the steam 18 arising during the drying 34 are obtained as saturated steam, so that the latent heat thereof can be made usable directly or after compression or relaxation by condensation and coupled back into the process.

Figure 3:
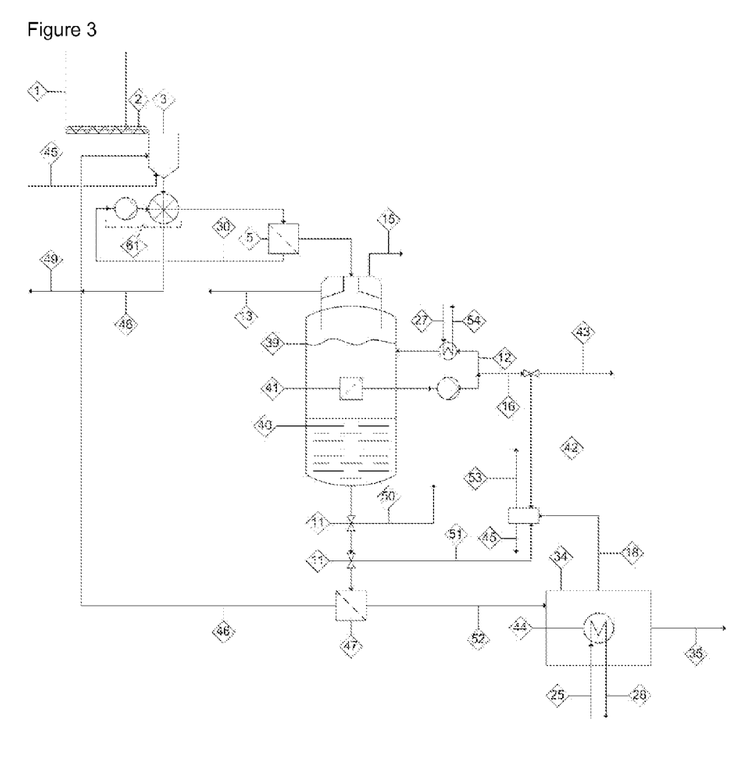
FIG. 3. Continuous Method for Hydrothermal Carbonization of Biomass (Wood Chips, 60×60×60 mm)

The invention is described further as follows on a third exemplary embodiment with the aid of FIG. 3:

The feedstock is to be wood chips having a dry material fraction of approximately 50 mass-% and an edge length of at most 60×60×60 mm.

2000 kg/h wood chips 37, corresponding to an energy output of 5556 kW, is taken via a conveyor device 2 at ambient temperature from bulk goods silo 1 and supplied to the first processing stage, comprising the pulping container 3, the device for pressure increase 61, in this example a high-pressure pump and a rotary vane feeder, and the water separation 5.

The temperature of the feedstock is increased in this example by the addition of 200 kg/h waste steam 45, which was partially obtained during the flash relaxation of the sediment 40, to greater than 90° C. The ability to convey the feedstock is produced in that it is mixed in the pulping container 3 with a part of the process-internal wastewater 46 (1040 kg/h), which was taken from the mechanical drainage 47, and a part of the circulating water 48 (7800 kg/h), which was essentially separated from the feedstock again before the pressure increase in the rotary vane feeder and was replaced by the process-internal wastewater 30. The solid fraction of the feedstock before the rotary vane feeder thus sinks to less than 10 mass-%. The excess water (380 kg/h) is discharged from the process via 49 and supplied to conditioning or use, for example. The pressure increase in the rotary vane feeder is supported by the supply of the process-internal wastewater 30 from the water separation 5, which is supplied via a high-pressure pump of the rotary vane feeder.

In the pressure increase 61, the pressure of the feedstock-water mixture is raised to 25 bar and it is conveyed essentially by the process-internal waste water 30, which is guided in the circuit, into the water separation 5, where this water is essentially separated from the feedstock again and from which the drained feedstock is supplied to the second processing stage. The pressure increase can also be performed in two combinations of high-pressure pump and rotary vane feeder connected in series, if this is advantageous or is required to reach the required pressure.

The feedstock is introduced from above having a solid content of greater than 30 mass-% into the second processing stage, which operates under a pressure of 20 bar and in which the solid releases entrained water, and preheated therein by circulating water 12—heated by condensation of approximately 420 kg/h hot steam 27—to the temperature required for hydrothermal carbonization, in this example 220° C.

The feedstock sinks into the water bath 39 because of gravity, where it carbonizes while releasing heat under a pressure of 20 bar and at most boiling temperature of the water with precipitation of 100 kg/h chemically bound water and formation of 100 kg/h permanent gases, such as carbon dioxide, which are discharged from the process via 15, and settles as sediment 40. In this example, the water bath has a solid content of less than 5 mass-% above the sediment layer, which ensures a good circulation capability. It is clear from this example that permitting the buildup of a sediment layer according to the invention results in a substantial concentration of solid at the sediment output and thus keeps a majority of the processing water in the second processing stage.

The sediment 40 is discharged from the second processing stage via 11 in two stages, mechanically, and in a regulated manner with flash vaporization of a part of the sediment water 50, 51, the flash vaporization being performed in two stages and flash steam being obtained in this example as moderate pressure steam at approximately 6 bar (50; 360 kg/h) and as low-pressure steam at approximately 1 bar (51; 270 kg/h), and supplied to the third processing stage, comprising mechanical drainage 47 and steam-heated drying in steam atmosphere 34.

The thermal equilibrium of the second processing stage is maintained by the removal of processing water via a removal device having solid retention 41, the circulation 12 thereof, it being heated in a heat exchanger by condensation of hot steam 27, the removal of steam 13, and the removal of water 16.

The water balance of the second processing stage is equalized by the removal of 80 kg/h processing water via 16, which is flash relaxed and is introduced as water 43 (60 kg/h) either as additional water into the pulping container 3 or is discharged from the process, and saturated steam 42 (20 kg/h), which is available for further energetic use.

The sediment conveyed via 11 from the second processing stage into the mechanical drainage 47 is mechanically drained therein to a dry material fraction of greater than 50 mass-%, the filtrate 46 (1060 kg/h) is partially supplied as process-internal wastewater to the pulping container 3, and the concentrate, the mechanically drained, carbonized feedstock 52 (1600 kg/h) is supplied to the drying 34, where it is indirectly dried with the aid of steam-heated surfaces 44, to form hot steam condensate 28 and approximately 730 kg/h saturated steam 18, under slight overpressure in a steam atmosphere, and delivered from the process via 35 having a water content of 8 mass-% (800 kg/h solid and 70 kg/h water).

The flash steam 51 arising in the second stage of the sediment relaxation 11, the steam 18 arising during the drying 34, and the flash steam 42 of the water removed from the second processing stage via 16 are obtained as saturated steam, can be combined, and are available, after exhausting the steam stream to preheat the feedstocks 45 in the pulping container 3, as low-pressure steam 53 (approximately 1 bar) for further energetic use by direct condensation or after compression or relaxation.

Furthermore, the flash steam 50 arising in the first stage of the sediment relaxation 11 is available as moderate-pressure steam (approximately 6 bar) for further use through direct condensation or after compression or relaxation.

In the example, the final product is a product similar to lignite pulverized fuel, which is delivered via 35 from the process having a mass flow rate of approximately 870 kg/h and a water content of approximately 8 mass-% and a fuel value of 5376 kW.

The energetic efficiency of the chemical conversion is greater than 95% in the example.

In relation to the second exemplary embodiment, third exemplary embodiment displays a further improved method control over the second exemplary embodiment with respect to the energy and water economy of the process. Since the temperature of the feedstock can be increased by the return of waste heat in the form of waste steam from the flash relaxation and in the form of wastewater from the mechanical drainage, so that the specific demand for hot steam 27 in the second processing stage decreases and simultaneously the hot steam demand 25 in the drying is reduced by the upstream mechanical drainage. The water separated in the mechanical drainage is advantageously used to produce the pumping capability of the feedstock and to provide the water required for implementing the second processing stage, which is not introduced into the process, as in the first exemplary embodiment, together with the feedstock, which is drier in comparison to the first exemplary embodiment.

The quantity of water to be delivered from the plant in this example results from the sum of the streams 49 and 43 and the streams 50 and 53 after direct condensation or after condensation performed after a compression or relaxation.

Figure 4:
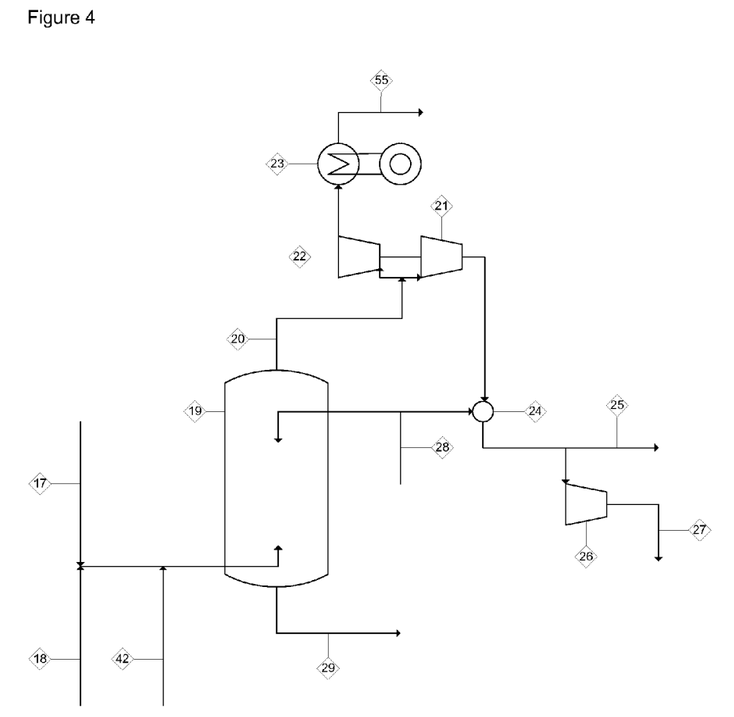
FIG. 4. Continuous Method for Hydrothermal Carbonization of Biomass (Grass and Foliage using exhaust steam)

The usage according to the invention of the exhaust steam streams is described as follows with the aid of FIG. 4 on a fourth exemplary embodiment, which is to be considered in combination with the second exemplary embodiment (FIG. 2):

The flash steams 17 and 42 arising during the sediment relaxation 11 and the relaxation of the water taken from the second processing stage via 16, as well as the steam 18 arising during the drying 34, are isothermally washed in the steam washing 19 using the hot steam condensate 28 arising during the drying.

The washed steam 20 is compressed in the compressor 21 to the hot steam pressure required for implementing the third processing stage, deheated by injecting hot steam condensate in 24, i.e., essentially brought to saturated steam temperature, and then supplied to the heating surfaces of the drying via 25.

In the event of existing heating demand in the second processing stage, according to the invention, steam compressed in 21 can be supplied after the recooling in 24 to a second compression stage 26 and compressed therein to the pressure required for feeding into the second processing stage via 27.

Steam which is not required for the heating of the second and third processing stages can be relaxed to ambient temperature level according to the invention in an expansion 22 while releasing technical work and liquefied in a condensation 23. Alternatively, simple condensation of the excess steam while releasing heat can also be performed.

The steam condensate arising at 55 and the process-internal wastewater arising at 29 from the isothermal steam washing are either used internally in the process as circulating water, if needed, or optionally discharged from the process after conditioning.

Figure 5:
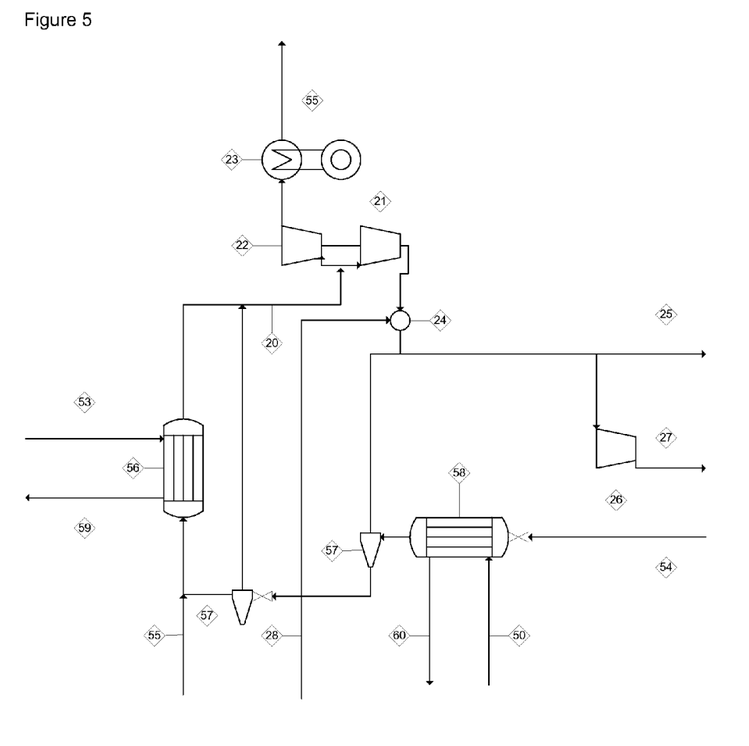
FIG. 5. Continuous Method for Hydrothermal Carbonization of Biomass (Wood Chips, 60×60×60 mm using waste steam)

The usage according to the invention of the waste steam streams is described as follows with the aid of FIG. 5 on a fifth exemplary embodiment, which is to be considered in combination with the third exemplary embodiment (FIG. 3):

The low-pressure steam 53 (approximately 1 bar) not required for the regenerative preheating of the feedstocks is condensed in a low-pressure vaporizer 56. In counterflow thereto, the hot steam condensate 28 arising in the drying, after it has been flash relaxed and the resulting flash steam has been separated in the liquid-steam separator 57, is vaporized together with the steam condensate 55 from the expansion 22 and results, together with the flash steam from 57, in the low-pressure steam 20. It is to be noted that the low-pressure steam 20 is generated at a pressure of approximately 0.9 bar because of the temperature difference required in the heat exchanger.

The low-pressure steam 20 (approximately 0.8 bar) is compressed in the compressor 21 to the hot steam pressure required for the implementation of the third processing stage, deheated by injection of hot steam condensate in 24, i.e., brought essentially to saturated steam temperature, and then supplied, together with flash steam from the relaxation of the condensate 54 and additional steam generated in 58 and separated in 57, to the heating surfaces of the drying via 25.

If a heating demand exists in the second processing stage, according to the invention, steam compressed in 21 can be supplied after the recooling in 24 to a second compression stage 26 and compressed therein to the pressure required for coupling into the second processing stage via 27. The condensate 54 of the hot steam 27 is flash relaxed and partially vaporized in the moderate-pressure vaporizer 58 by condensation of moderate-pressure flash steam 50 (approximately 6 bar). The steam thus obtained, which is generated at a pressure of approximately 5 bar because of the temperature difference required in the heat exchanger, is separated in the liquid-steam separator 57 from the liquid phase and supplied as hot steam, together with the steam compressed in 21 and deheated in 24, to the drying via 28. The liquid phase is mixed together with the hot steam condensate from the drying 28 and used partially for recooling steam in 24 and partially for generating low-pressure steam.

Steam which is not required for heating the second and third processing stages can be relaxed to ambient temperature level according to the invention in an expansion 22 while releasing technical work and liquefied in a condensation 23. Alternatively, a simple condensation of the excess steam while releasing heat can be performed.

The low-pressure steam condensate arising at 59 and the moderate-pressure steam condensate arising at 60 are either used internally in the process as circulating water if the demand exists or optionally discharged from the process after conditioning.

LIST OF REFERENCE NUMERALS

1 bulk good silo
2 conveyor device
3 delivery funnel/pulping container
4 thick-matter pump
5 water separation
6 bulk goods delivery
7 first processing step, second processing stage
8 bulk layer of the feedstock
9 second processing step, second processing stage
10 third processing step, second processing stage
11 sediment outlet with flash relaxation
12 circulating processing water from the second processing stage
13 removed steam from the second processing stage 14 steam addition
15 permanent gas discharge
16 processing water from the second processing stage
17 flash steam from sediment relaxation
18 steam from the drying
19 isothermal flash steam washing
20 low-pressure steam before compressor I
21 compressor I
22 expansion
23 condensation
24 recooled steam
25 hot steam drying
26 compressor II
27 hot steam for heating the second processing stage
28 hot steam condensate from the drying
29 process-internal wastewater from the steam washing
30 process-internal wastewater from the water separation
31 vapors from thickening
32 fertilizers
33 processing water thickening
34 dryer in steam atmosphere
35 product outlet
36 hot steam condensate for the isothermal washing
37 feedstock before the first processing stage
38 pressure airlock
39 water bath in the second processing stage
40 sediment in the second processing stage
41 removal device having solid retention
42 flash steam from the relaxation of processing water
43 relaxed processing water
44 steam-heated surfaces
45 waste steam for preheating
46 process-internal wastewater from mechanical drainage
47 mechanical drainage
48 circulating water for feedstock conveyance
49 delivered processing water
50 moderate-pressure flash steam from sediment relaxation
51 low-pressure flash steam from sediment relaxation
52 carbonized feedstock after mechanical drainage
53 low-pressure steam
54 hot steam condensate from the second processing stage
55 steam condensate expansion
56 heat exchanger/low-pressure vaporizer
57 liquid-steam separator
58 heat exchanger/moderate-pressure vaporizer
59 low-pressure steam condensate
60 moderate-pressure steam condensate
61 high-pressure pump and rotary vane feeder

The invention claimed is:

1. A method for continuous hydrothermal carbonization of feedstock comprising biomass to produce marketable coal having a water content of less than 30 mass percent, the method comprising:
a first step, comprising pressurizing the feedstock to at least 5 bar;
a second step, comprising converting the feedstock into a carbonized product inside a reactor, wherein the feedstock undergoes dehydration and decarboxylation at a pressure of at least 5 bar and a temperature at or below the boiling point of water, resulting in reaction products comprising water, carbon dioxide, and carbon-containing product, wherein the second step further comprises:
(a) circulating water in an upper portion of the reactor to circulate the feedstock in the upper portion, wherein removal and at least partial resupply of water from the upper portion of the reactor results produces at least a portion of the circulation,
(b) settling the carbon-containing product in a lower portion of the reactor as water-containing sediment, wherein the lower portion of the reactor is not subject to mixing,
(c) selecting a minimum height of water-containing sediment so that the solid content of the water-containing sediment is increased by sedimentation to at least 15% and selecting a maximum height of sediment layer so that a solid bottom fraction does not form due to static pressure,
(d) regulating the water level in the reactor by removing or supplying water, and
(e) discharging at least some gaseous products arising in the reactor in counterflow to the feedstock entering the reactor so that at least some faction of gaseous water condenses on the feedstock; and
a third step, comprising delivering the water-containing sediment to a dryer, wherein the dryer dries the water-containing sediment in a steam atmosphere.

2. The method according to claim 1,
wherein in the second step an approximately isothermal process sequence is obtained by utilizing (a) steam removal, (b) heating, and (c) resupply of the water removed for the circulation.

3. The method according to claim 1,
wherein a flash steam arising from the pressure reduction of the water that is not resupplied to the second step and the steam arising during the drying of the third step are isothermally washed and then compressed or relaxed in a force process, wherein the pressure stages of the compression are determined by the pressure required for heating the drying of the third step and by the pressure required for heating the second step.

4. The method according to claim 1,
wherein a flash steam from the pressure reduction of the water that is not resupplied to the second step and the steam arising during the drying are condensed to generate live steam, which is then compressed or relaxed in a force process, wherein the pressure stages of the compression are determined by the pressure required for heating the drying of the third step and by the pressure required for heating the second step.

5. The method according to claim 1,
wherein water arising in the isothermal washing of a flash steam and drying steam is supplied to the feedstock in the first step before pressurizing the feedstock and, after releasing a part of its heat to the feedstock, is at least partially re-separated from the feedstock before the second step and supplied to a utilization.

6. The method according to claim 5,
wherein the water that is re-separated from the feedstock before the second step is concentrated by evaporation before being supplied to a utilization.

7. The method according to claim 1,
wherein a portion of the steam arising from the second step is condensed in a vaporizer, wherein a condensate from the vaporizer is supplied to the feedstock in the first step before pressurizing the feedstock, and wherein after releasing a part of its perceptible heat, the condensate is at least partially discharged before the second step and supplied to a utilization.

8. The method according to claim 7, wherein the condensate that is at least partially discharged before the second step is concentrated by evaporation before being supplied to a utilization.

9. The method according to claim 1, wherein (c) further comprises:

selecting a minimum height of water-containing sediment so that solid content is increased by sedimentation to at least 20% and selecting a maximum height of sediment layer so that a solid bottom fraction does not form due to static pressure.

10. The method according to claim 1, wherein (c) further comprises:
selecting a minimum height of water-containing sediment so that solid content is increased by sedimentation to at least 30% and selecting a maximum height of sediment layer so that a solid bottom fraction does not form due to static pressure.

11. The method according to claim 1, wherein in the third step
sediment delivered from second step is dried, wherein the drying is performed in a steam atmosphere, producing final product in the form of marketable coal having a water content of less than 20 mass percent.

12. The method according to claim 1, wherein in the third step
sediment delivered from second step is dried, wherein the drying is performed in a steam atmosphere, producing final product in the form of marketable coal having a water content of less than 15 mass percent.

13. The method according to claim 1, further comprising:
increasing the temperature of the feedstock in the first step by providing a mixture of feedstock with waste water or waste steam from the second and third steps, wherein water supplied in the first step remains as circulating water in the process.

14. The method according to claim 1, further comprising:
in the first step, conveying the feedstock in the presence of a liquid and, immediately before pressurizing the feedstock, the liquid is process-internal wastewater.

15. The method according to claim 1,
wherein in the second step an approximately isothermal process sequence is obtained by utilizing one or more of (a) steam removal, (b) the resupply of the water removed for the circulation, and (c) adding external hot steam which condenses in the processing step.

16. The method according to claim 1,
wherein a mechanical drainage is connected upstream from drying of the third step and drains a concentrate which is re-introduced into the drying of the third step using steam.

17. The method according to claim 16, wherein a filtrate arising in the mechanical drainage is supplied to the feedstock in the first step before pressurizing the feedstock and, after releasing a part of its heat to the feedstock, is at least partially discharged before the second step and supplied to a utilization.

18. The method according to claim 17,
wherein the filtrate that is at least partially discharged before the second step is concentrated by evaporation before being supplied to a utilization.

* * * * *